(12) United States Patent
Nayakbomman et al.

(10) Patent No.: US 11,074,091 B1
(45) Date of Patent: Jul. 27, 2021

(54) DEPLOYMENT OF MICROSERVICES-BASED NETWORK CONTROLLER

(71) Applicant: Juniper Networks, Inc., Sunnyvale, CA (US)

(72) Inventors: Madhukar Nayakbomman, San Jose, CA (US); Muhammad Qasim Arham, Frisco, TX (US)

(73) Assignee: Juniper Networks, Inc., Sunnyvale, CA (US)

( * ) Notice: Subject to any disclaimer, the term of this patent is extended or adjusted under 35 U.S.C. 154(b) by 132 days.

(21) Appl. No.: 16/144,650

(22) Filed: Sep. 27, 2018

(51) Int. Cl.
| | |
|---|---|
| *G06F 15/16* | (2006.01) |
| *G06F 9/455* | (2018.01) |
| *G06F 8/65* | (2018.01) |
| *H04L 29/08* | (2006.01) |

(52) U.S. Cl.
CPC ............... *G06F 9/455* (2013.01); *G06F 8/65* (2013.01); *G06F 9/45533* (2013.01); *H04L 67/1095* (2013.01); *H04L 67/1097* (2013.01)

(58) Field of Classification Search
CPC ........ G06F 9/455; G06F 8/65; G06F 9/45533; H04L 67/1097; H04L 67/1095
USPC .................. 709/224, 203, 220, 226, 227; 370/395.52, 392, 236, 400, 397, 431, 389
See application file for complete search history.

(56) References Cited

U.S. PATENT DOCUMENTS

| | | | |
|---|---|---|---|
| 9,571,394 B1 * | 2/2017 | Sivaramakrishnan | ....................... H04L 45/7453 |
| 10,289,457 B1 * | 5/2019 | Slawomir | ................. G06F 9/54 |
| 2006/0146837 A1 * | 7/2006 | Atsuki | ..................... H04L 69/16 370/400 |
| 2007/0014299 A1 * | 1/2007 | Chang | ................. H04L 49/1553 370/397 |
| 2010/0115515 A1 * | 5/2010 | Drabant | ................ G06F 9/5038 718/100 |
| 2011/0276699 A1 * | 11/2011 | Pedersen | ............... H04L 47/781 709/227 |

(Continued)

FOREIGN PATENT DOCUMENTS

WO 2013184846 A1 12/2013

OTHER PUBLICATIONS

Mackie et. al, "BGP-Signaled End-System IP/VPNs," draft-ietf-l3vpn-end-system-06, Dec. 15, 2016, 31 pp.

(Continued)

*Primary Examiner* — Thuong Nguyen
(74) *Attorney, Agent, or Firm* — Shumaker & Sieffert, P.A.

(57) ABSTRACT

A distributed network controller that is configured in a containerized architecture is described. The network controller includes a plurality of microservices packaged and deployed using respective containers for the microservices, according to a plurality of charts, each chart comprising one or more templates that define a manner in which the microservices, for performing respective operations of the network controller, are deployed on a plurality of servers within the data center. Execution of the microservices of the distributed network controller establishes a virtual network for packetized communications among virtual execution elements executing on the plurality of servers in the data center. Each container that includes one of the plurality of microservices is executed by a server of the plurality of servers as an isolated user-space instance on the server.

17 Claims, 10 Drawing Sheets

(56) References Cited

U.S. PATENT DOCUMENTS

| | | | | |
|---|---|---|---|---|
| 2016/0127254 | A1* | 5/2016 | Kumar | H04L 47/70 |
| | | | | 709/226 |
| 2016/0269425 | A1* | 9/2016 | Shieh | H04L 63/0254 |
| 2017/0214550 | A1* | 7/2017 | Kumar | H04L 41/0654 |
| 2017/0230349 | A1* | 8/2017 | Gaur | G06F 21/00 |
| 2017/0242784 | A1* | 8/2017 | Heorhiadi | G06F 11/3692 |
| 2018/0069806 | A1* | 3/2018 | Kumar | H04L 47/829 |
| 2018/0077080 | A1* | 3/2018 | Gazier | H04L 41/5051 |
| 2018/0145886 | A1* | 5/2018 | Rao | H04L 43/12 |
| 2018/0152534 | A1* | 5/2018 | Kristiansson | H04L 67/16 |
| 2018/0309630 | A1* | 10/2018 | Zhao | H04L 41/145 |
| 2018/0309802 | A1* | 10/2018 | Sahu | H04L 67/02 |
| 2018/0349033 | A1* | 12/2018 | Kapadia | G06F 9/546 |
| 2019/0018815 | A1* | 1/2019 | Fleming | G06F 13/423 |
| 2019/0272205 | A1* | 9/2019 | Jiang | G06F 9/5077 |
| 2020/0059370 | A1* | 2/2020 | Abraham | H04L 67/10 |
| 2020/0065086 | A1* | 2/2020 | Woodmansee | G06F 9/5072 |

OTHER PUBLICATIONS

Rosen et al. "BGP/MPLS IP Virtual Private Networks (VPNs)," Request for Comments 4364, Internet Engineering Task Force Network Working Group, Feb. 2006, 47 pp.

* cited by examiner

DEPLOYMENT OF MICROSERVICES-BASED NETWORK CONTROLLER

TECHNICAL FIELD

The disclosure relates to a virtualized computing infrastructure and, more specifically, to a microservices-based network controller deployed to virtualized computing infrastructure within a network.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for a distributed network controller in which a plurality of containerized applications (e.g., microservices) are deployed, using one or more charts, to a container-centric computing architecture. In one example deployment, the one or more charts may specify different sets of containers for executing different functions of the distributed network controller. The one or more charts may also specify one or more ingresses and services for the distributed network controller. Based on the one or more charts, the various sets of containers, ingresses, and services may be deployed to the container-centric computing architecture and executed to control network connectivity for packetized communications among virtual execution elements executing in the container-centric computing architecture.

The techniques of this disclosure may provide one or more technical advantages. For example, a microservices-based network controller executing on a container-centric computing architecture may permit the use of orchestration platform resources for exposing one or more interfaces of the network controller to an orchestration system. For instance, endpoints of the network controller application programming interface (API) may be exposed using services and ingresses of the orchestration platform. As another example, by defining the deployment of the microservices via the example charts, an administrator applying the techniques described herein may be able to more readily provide in service software upgrade (ISSU) of the network controller by releasing a chart that packages new, upgraded microservices while the current network controller is executing.

In one example, the disclosure describes a system comprising one or more computing devices, the one or more computing devices comprising a memory configured to store a plurality of charts, and processing circuitry configured to execute a distributed network controller that includes a plurality of microservices packaged and deployed using respective containers for the microservices, according to the plurality of charts, each chart comprising one or more templates that define a manner in which the microservices, for performing respective operations of the network controller, are deployed on a plurality of servers within the data center. The processing circuitry is configured to execute the plurality of microservices of the distributed network controller to establish a virtual network for packetized communications among virtual execution elements executing on the plurality of servers in the data center, and each container that includes one of the plurality of microservices is executed by a server of the plurality of servers as an isolated user-space instance on the server.

In one example, the disclosure describes a method comprising executing, with processing circuitry, a distributed network controller that includes a plurality of microservices packaged and deployed using respective containers for the microservices, according to a plurality of charts, each chart comprising one or more templates that define a manner in which the microservices, for performing respective operations of the network controller, are deployed on a plurality of servers within the data center, and establishing, via the distributed execution of the network controller, a virtual network for packetized communications among virtual execution elements executing on the plurality of servers in the data center. Each container that includes one of the plurality of microservices is executed by a server of the plurality of servers as an isolated user-space instance on the server.

In one example, the disclosure describes a computer-readable storage medium storing instructions thereon that when executed cause one or more processors to execute a distributed network controller that includes a plurality of microservices packaged and deployed using respective containers for the microservices, according to a plurality of charts, each chart comprising one or more templates that define a manner in which the microservices, for performing respective operations of the network controller, are deployed on a plurality of servers within the data center, and establish, via the distributed execution of the network controller, a virtual network for packetized communications among virtual execution elements executing on the plurality of servers in the data center. Each container that includes one of the plurality of microservices is executed by a server of the plurality of servers as an isolated user-space instance on the server.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
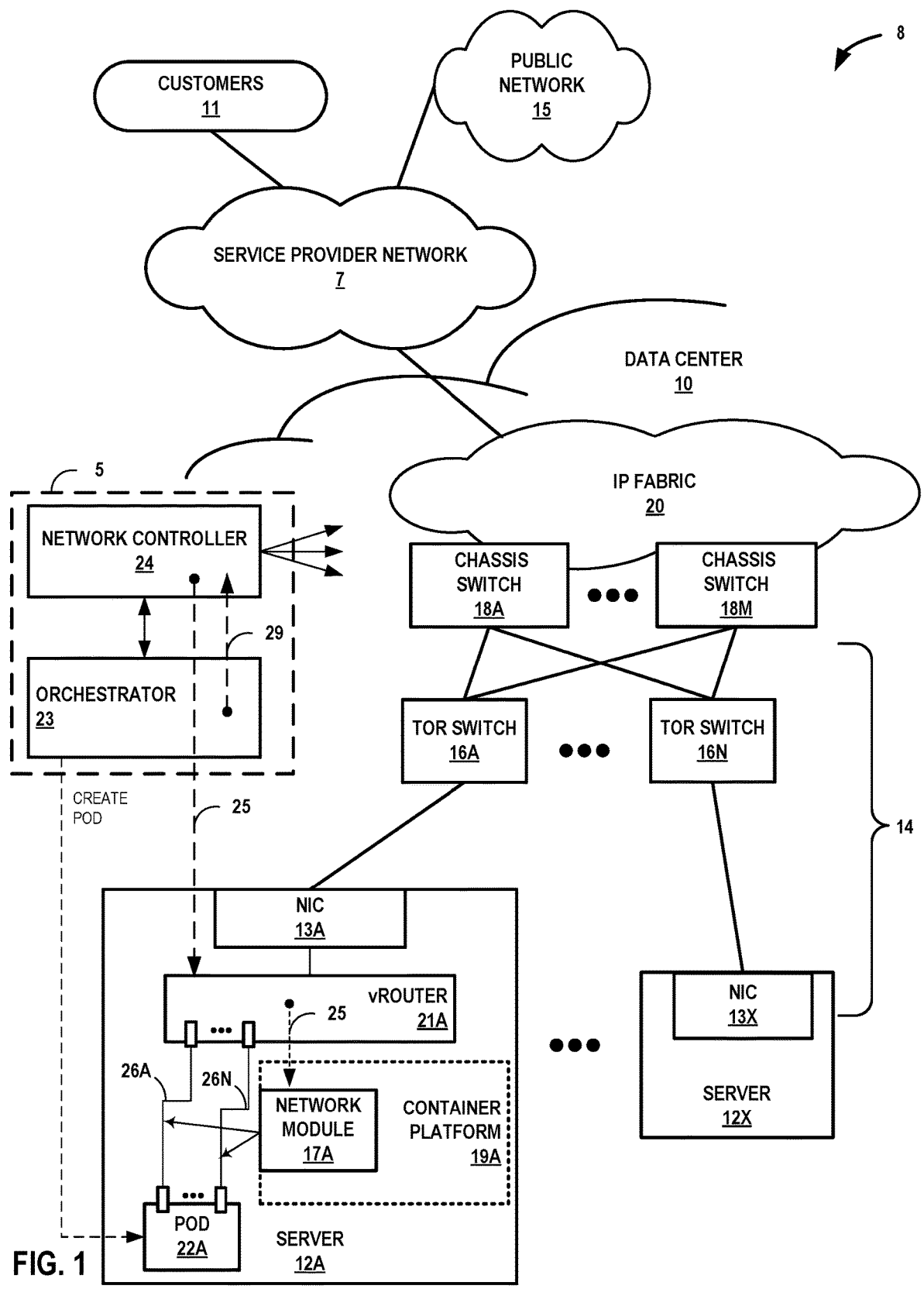
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, virtual routers 21 may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

In accordance with one or more example techniques described in this disclosure, an application suite and the application-specific libraries of a container may be a microservice for a larger application. For example, an application may be configured as a plurality of microservices, and each microservice provides a subset of functionality of all of the functionality provided by the application. As described in more detail, network controller 24 is an example of software that is architected as a plurality of microservices. This allows network controller 24 to be distributed among a plurality of servers 12. For example, one or more of servers 12 each execute one or more of the microservices as a way to execute network controller 24. A container may include the microservice and its specific libraries, and the microservice may execute by the host machine as an isolated user-space instance and may share an operating system and common libraries with other containers executing on the host machine. As such, the network controller 24 may include multiple microservices executed by respective containers that are distributed among and executed by servers 12.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A. Application programming interface endpoints for a controller described in PCT/US2013/044378 and U.S. patent application Ser. No. 14/226,509 may be implemented as orchestration platform resources, such a services and ingresses, according to techniques described herein.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23 to obtain and host, in server 12A, containers. Container platform 19A obtains and executes the containers. As one example, container platform 19A may be configured to execute one or more microservices that provide a part of the functionality of network controller 24.

Container platform 19A includes a network module 17A that configures virtual network interfaces for virtual network endpoints. The container platform 19A uses network module 17A to manage networking for pods, including pod 22A. For example, the network module 17A creates virtual network interfaces to connect pods to virtual router 21A and enable containers of such pods to communicate, via the virtual network interfaces, to other virtual network endpoints over the virtual networks. Network module 17A may, for example, insert a virtual network interface for a virtual network into the network namespace for containers of in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. Network module 17A may assign a network address (e.g., a virtual IP address for the virtual network) and may setup routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network Network module 17A may represent a library, a plugin, a module, a runtime, or other executable code for server 12A. Network module 17A may conform, at least in part, to the Container Networking Interface (CNI) specification or the rkt Networking Proposal. Network module 17A may represent a Contrail or OpenContrail network plugin. Network module 17A may alternatively be referred to as a network plugin or CNI plugin or CNI instance. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks.

The CNI specification specifies a number of considerations for a conforming plugin ("CNI plugin"). These include the following:

The container runtime must create a new network namespace for a container before invoking any CNI plugin.

The container runtime must then determine which networks this container should belong to, and for each network, which plugins must be executed.

The container runtime must add the container to each network by executing the corresponding plugins for each network sequentially.

In accordance with techniques of this disclosure, and as described above, network controller 24 may be architected and implemented as a plurality of microservices, where each microservice may be an application of a container. As one example, network controller 24 is architected as a plurality of microservices, where each of the microservices performs part of the functionality of network controller 24. There is a plurality of microservices, but each of the microservices need not necessarily be completely distinct from one another. For example, one or more microservices may operate together to perform a set of operations of network controller 24.

As one example, network controller 24 may perform the following example tasks: define interconnection tunnels between servers 12, provide analysis of the network (e.g., switch fabric 14), provide a mechanism to execute third-party tools, and manage execution of vrouters (e.g., like vrouter 21A). The above example tasks of network controller 24 should not be considered as limiting. Network controller 24 may perform more tasks than the above example tasks or may perform fewer tasks than the above example tasks. For ease of illustration and description, network controller 24 is described as performing the above example tasks.

To manage the deployment of microservices of network controller 24 to perform the example techniques, memory (e.g., memory on one or more servers 12) stores a plurality of charts. One example of charts, in the context of Kubernetes, is the so-called Helm chart. The plurality of charts package one or more microservices together and define the manner which the one or more microservices are to be deployed. In other words, network controller 24 is configured as a plurality of microservices packaged and deployed via the plurality of charts. Each of the charts includes one or more templates that define a manner in which respective microservices, for performing respective operations of network controller 24, are deployed on respective servers 12 within data center 10.

As an example, to construct the charts, an administrator may provide image name of respective microservices in charts, and defines the respective containers, such as using a Kubernetes interface. The administrator, on a local computer, may execute a package manager, such as the Helm package manager for Kubernetes, to construct the plurality of charts. Each chart includes a templates section with which the administrator defines the microservices for that chart, and the manner in which the microservices are to be deployed. As one example, the templates may be in the form of .yaml files, and the .yaml file for a first microservice may define the ports that are accessible by the microservice, the order in which the microservice is to execute, where the microservice is to output its data, to which container the microservice belongs, etc. Factors such as port accessibility, order of execution, where to output data, and to which container the microservice is to output its data are all examples of a manner in which a microservice is deployed. There may be more or fewer parameters or items in the template file (e.g., .yaml file) of the microservice than the examples provided above, and such parameters or items are also examples of the manner in which a microservice is deployed.

In one or more examples, there is a chart for each of the example tasks. For example, the administrator creates a chart for microservices that define interconnection tunnels between servers 12, referred to as a control chart, creates a chart for microservices that provide analysis of the network (e.g., switch fabric 14), referred to as analytics chart, creates a chart for microservices that provide a mechanism to execute third-party tools, referred to as third-party chart, and creates a chart for microservices that manage execution of vrouters (e.g., like vrouter 21A), referred to as vrouter chart.

Configuring network controller 24 as containerized microservices may provide one or more technical advantages. It should be understood that the potential advantages of configuring network controller 24 as containerized microservices is not always necessary. As one example, configuring network controller 24 as containerized microservices may facilitate the use Kubernetes or other types of orchestration, and the advantages associated with such orchestration. Kubernetes, as an example, provides for functionality such as health checks, rolling upgrades, and resource management so that Kubernetes orchestration can manage the microservices and ensure that the container and pods of containers are communicating correctly with one another, are able to be accessed via a common ingress or egress point, are being scaled up properly, and the like.

Moreover, using charts as a way to package and deploy microservices for different tasks may provide additional benefits. The rolling upgrades provided by Kubernetes function well for minor upgrades, but relying simply on Kubernetes, without any further definition for how to deploy microservices, to provide functionality for major upgrades may not be feasible.

For instance, in service software upgrades (ISSU) of microservices of network controller 24 may be better managed with the use of the example charts, where each chart defines a manner in which the respective microservices are deployed. With ISSU, network controller 24 should be upgraded while network controller 24 is operating. For example, while a first version of network controller 24 is executing, a second version (e.g., updated version) of network controller 24 can be installed, and then the first version of network controller 24 is disabled after migrating servers 12 to second version of network controller 24. In some techniques, such as where network controller 24 is not configured as microservices, such in service upgrades would not be feasible because the functionality of network controller 24 was not properly apportioned to microservices and to the extent there was apportioning of the functionality of network controller 24, the apportioning is not done in a containerized form. Therefore, for these other techniques, it may not have been feasible to only upgrade a portion of network controller 24 without needing to temporarily disable operation of network controller 24.

With the user of the charts, ISSU of network controller 24 may be more feasible, as compared to other examples of network controllers. For instance, when time to upgrade network controller 24 from first version to second version, the administrator may update values or other configuration information of the chart or charts needed for the upgrade. For example, the administrator may upgrade the templates of the charts to define the deployment of the new microservices of network controller 24, where the new microservices may be the upgraded versions of existing microservices or microservices that were previously not part of network controller 24.

To perform the ISSU, the processing circuitry, which may be distributed across one or more servers 12, may receive updated charts, in what is called as a release of the chart, that defines the deployments of the new microservices. In one or more examples, the updated charts may be the same as previous charts, such as identifying the same set of microservices. However, the microservices may be upgraded, and the configuration information or other values such as manifest may change. In other words, the microservices of a chart may remain the same, but the version of the microservices may be change as part of the upgrade. In one or more examples, the updated charts may be updated to identify new or different microservices rather than just upgrades of a microservice. Updated charts describe both such examples.

The processing circuitry may currently be causing network controller 24 to execute on a first set of containers. The processing circuitry may cause the upgraded microservices to execute on a second set of containers, that may be different than the first set of containers. The processing circuitry may also cause the existing microservices (e.g., those that were not upgrades) to execute as another instantiation of the microservices on the second set of containers. Once the upgraded network controller 24 is executing on the second containers, the processing circuitry may disable execution of network controller 24 on the first set of containers. In this way, the processing circuitry upgrades network controller 24 in service while network controller 24 is still executing to perform the ISSU, as sometimes called as an AB upgrade.

The use of the plurality of charts may allow for deployment of microservices in a way that does not disrupt operation of network controller 24 during the ISSU. As one example, as described above, the example charts include the control chart, analytics chart, vrouter chart, and third-party chart. By forming the charts in this example manner, piecemeal updates of the various functionality of network controller 24 may be possible in a non-disrupting manner. As another example of the technical advantages of a microservices-based network controller 24 executing on a container-centric computing architecture, network controller 24 may permit the use of orchestration platform resources for exposing one or more interfaces of the network controller to an orchestration system. For instance, endpoints of a network controller 24 application programming interface (API) may be exposed using services and ingresses of the orchestration platform having orchestrator 23. For example, orchestrator 23 may request, using network controller 24 APIs exposed using services and ingress, network configurations for switching fabric 14 and servers 12 to facilitate communications among virtual execution elements managed by the orchestrator 23.

For instance, network controller 24 may be executing on a first set of virtual containers on servers 12. The processing circuitry (e.g., on which network controller 24 is executing) may receive an updated control chart (e.g., release of updated version of control chart for second, updated version of network controller 24). The processing circuitry may execute the microservices identified in the updated control chart on a second set of containers on servers 12 to allow for parallel operation so that network controller 24 can be upgraded without disruption in service.

Moreover, by separating out the analytics chart from the control chart, the current version(s) of the microservices of the analytics chart can remain executing while the second set of containers on servers 12 begin the execution of the microservices of the control chart. As part of the configuring of the microservices of the updated control chart, the processing circuitry executes a plurality of "jobs" that spin up to perform initialization and configuration tasks, and then disable. In some examples, one of the jobs for configuring microservices of the updated control chart may cause the microservices of the updated control chart and the microservices of the current control chart to both communicate with the current version(s) of the microservices of the analytics chart. In this case, both the current and updated version(s) of the microservices of the control chart would have access to the microservices of the analytics chart.

The processing circuitry may receive an updated vrouter chart. In this example, one or more jobs may execute on the processing circuitry to migrate the containers executing the microservices of the current vrouter chart to execute the containers executing the microservices of the updated vrouter chart one at a time. By separating out the microservices based on their functionality into the different example charts, the microservices of the vrouter can be migrated one at a time, while the upgraded microservices of the updated control chart are executing in parallel with the current microservices of the current control chart. For example, the upgrades of the control functionality and vrouter functionality can be updated piecemeal.

The processing circuitry may receive an updated analytics chart. The processing circuitry may execute the microservices of the updated analytics chart, and execute one or more jobs to configured the microservices of the updated control chart to communicate with the microservices of the updated analytics chart. Once this process is over, the processing circuitry may be executing the new version of network controller 24 and can disable execution of the old (previously current) version network controller 24.

The processing circuitry may perform similar operations for the third-party chart. With the third-party chart, the microservices may be for third-party tools provided by external developers. In some examples, the only update for network controller 24 may be the change in the third-party tools. By separating out the third-party chart from the rest of the charts, it may be possible to only update network controller 24 with the new microservices for the third-party tool.

There may be other manners in which separating the charts to include microservices for separate distinct functionalities of network controller 24 may be beneficial. For instance, a database (e.g., distributed across one or more servers 12) stores information of the current state of the network including the virtual network defined by network controller 24. The control chart may define the microservices that perform the functionality of setting up the virtual network and storing the state information in the database. During an upgrade of network controller 24, it may be very important to ensure that the database is not corrupted and that the state information in the database is not lost. Otherwise, the upgraded network controller 24 may not route traffic correctly. Therefore, the control chart may define deployment of the respective microservices used to define the interconnection tunnels such that the database storing the state information is first synchronized with the new microservices before disabling the existing execution of network controller 24.

As another example, the microservices of network controller 24 that perform the analytics functionality may be configured to regularly store analytics information in a backup database. For an upgrade, the analytics chart that defines the microservices that perform the analytics functionality may define deployment of the respective microservices used to perform the analytics functionality to rely on the backup database, rather than needing to synchronize with a database that stores the analytics information.

Figure 2:
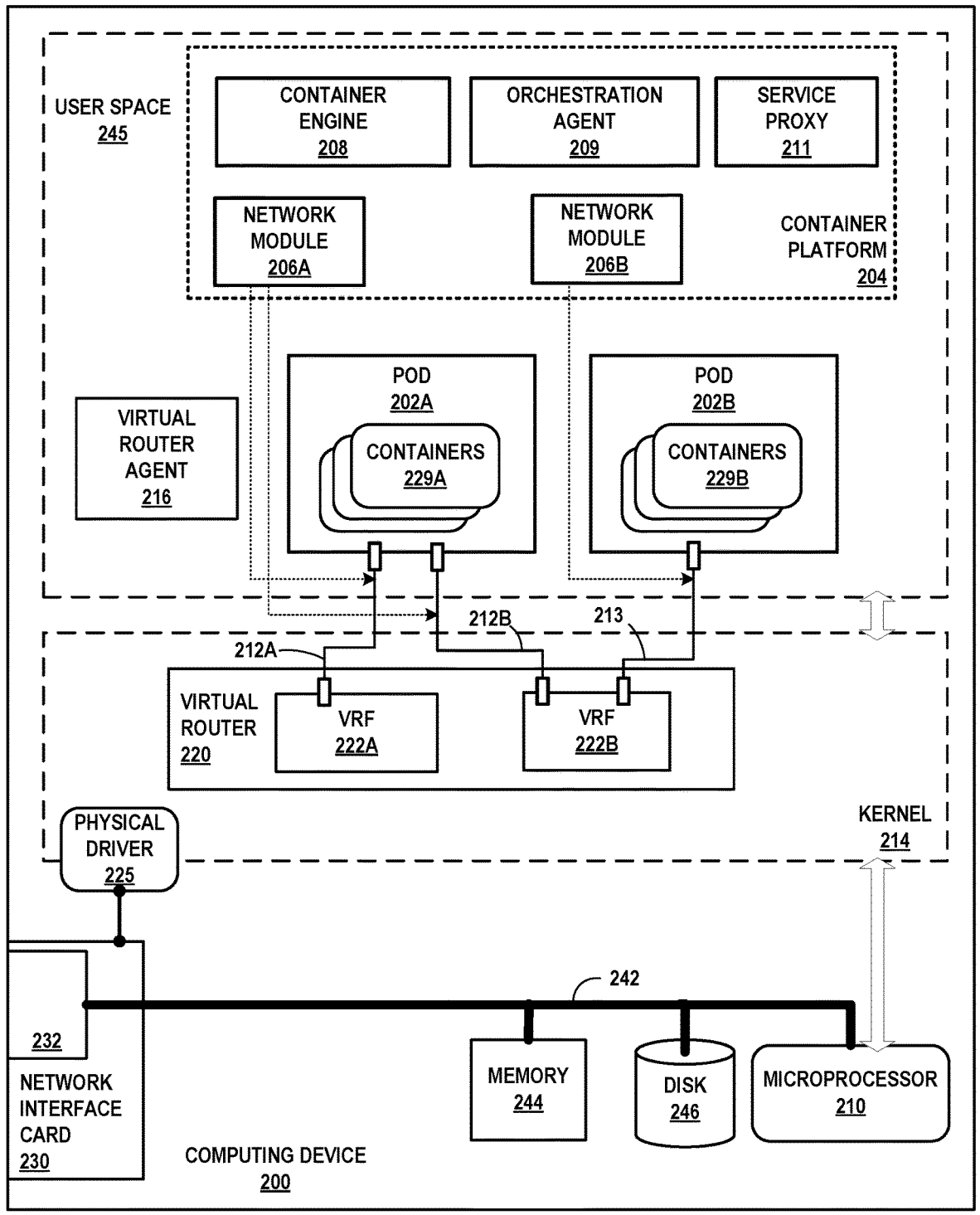
FIG. 2 is a block diagram of an example computing device that includes a network module for configuring multiple virtual network interfaces for a set of one or more virtual execution elements that share at least one virtual network interface, according to techniques described in this disclosure.

FIG. 2 is a block diagram of an example computing device (e.g., host) that includes a network module for configuring multiple virtual network interfaces for a set of one or more virtual execution elements that share at least one virtual network interface, according to techniques described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within kernel 214, but virtual router 220 may execute within a hypervisor, a host operating system, a host application, or a virtual machine in various implementations.

Virtual router 220 may replace and subsume the virtual routing/bridging functionality of the Linux bridge/OVS module that is commonly used for Kubernetes deployments of pods 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 220 may represent a PE router and virtual execution endpoints may be examples of CE devices described in RFC 4364.

In general, each of pods 202A-202B may be assigned one or more virtual network addresses for use within respective virtual networks, where each of the virtual networks may be associated with a different virtual subnet provided by virtual router 220. Pod 202B may be assigned its own virtual layer three (L3) IP address, for example, for sending and receiving communications but may be unaware of an IP address of the computing device 200 on which the pod 202B. The virtual network address may thus differ from the logical address for the underlying, physical computer system, e.g., computing device 200.

Computing device 200 includes a virtual router agent 216 that controls the overlay of virtual networks for computing device 200 and that coordinates the routing of data packets within computing device 200. In general, virtual router agent 216 communicates with network controller 24 for the virtualization infrastructure, which generates commands to control creation of virtual networks and configure network virtualization endpoints, such as computing device 200 and, more specifically, virtual router 220, as a well as virtual network interfaces 212, 213. By configuring virtual router 220 based on information received from network controller 24, virtual router agent 216 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 22A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any containers of pods 202, and virtual router 220 exchanges packets with pods 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 220 implements one or more virtual routing and forwarding instances (VRFs) 222A-222B for respective virtual networks for which virtual router 220 operates as respective tunnel endpoints. In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212A. VRF 222A forwards the inner packet via virtual network interface 212A to POD 202A in response.

Containers 229A-229B may also source inner packets as source virtual network endpoints. Container 229A, for instance, may generate a layer 3 inner packet destined for a destination virtual network endpoint that is executed by another computing device (i.e., not computing device 200) or for another one of containers 229A-229B. Container 229A sends the layer 3 inner packet to virtual router 220 via virtual network interface 212A attached to VRF 222A.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 24 of FIG. 1) configures a default route in each of pods 202 to cause the virtual machines 224 to use virtual router 220 as an initial next hop for outbound packets. In some examples, NIC 230 is configured with one or more forwarding rules to cause all packets received from virtual machines 224 to be switched to virtual router 220.

Pods 202A-202B may represent example instances of pod 22A of FIG. 1, in further detail. Pod 202A includes one or more containers 229A, and pod 202B includes one or more containers 229B.

Container platform 204 may represent an example instance of container platform 19A of FIG. 1, in further detail. Container platform 204 include container runtime 208, orchestration agent 209, service proxy 211, and network modules 206A-206B. Each of network modules 206A-206B may represent an example instance of network module 17A of FIG. 1, there being invoked one network module 206 per pod 202.

Container engine 208 includes code executable by microprocessor 210. Container engine 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from controller agent 209, container engine 208 may obtain images and instantiate them as executable containers 229A-229B in pods 202A-202B.

One example of container engine 208 is a package manager such as Helm used with Kubernetes. For example, container engine 208 may define the charts used to deploy the containerized microservices of network controller 24. Via container engine 208, an administrator may generate the .yaml files of the charts that define the deployment of the respective microservices within virtual machines such that network controller 24 can be upgrades as an in-service software upgrade (ISSU), as described above. The microservices may each be part of a Kubernetes cluster, and the charts (e.g., Helm charts) may define the deployment of the microservices within the Kubernetes cluster.

Service proxy 211 includes code executable by microprocessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and pods 202 by network modules 206.

Orchestration agent 209 includes code executable by microprocessor 210. Orchestration agent 209 may be one or more computer processes. Orchestration agent 209 may represent a kubelet for a minion node of a Kubernetes cluster. Orchestration agent 209 is an agent of an orchestrator, e.g., orchestrator 23 of FIG. 1, that receives container specification data for containers and ensures the containers execute by computing device 200. Container specification data may be in the form of a manifest file (e.g., such as defined by the plurality of charts) sent to orchestration agent 209 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229. Based on the container specification data, orchestration agent 209 directs container engine 208 to obtain and instantiate the container images for containers 229, for execution of containers 229 by computing device 200.

Figure 3:
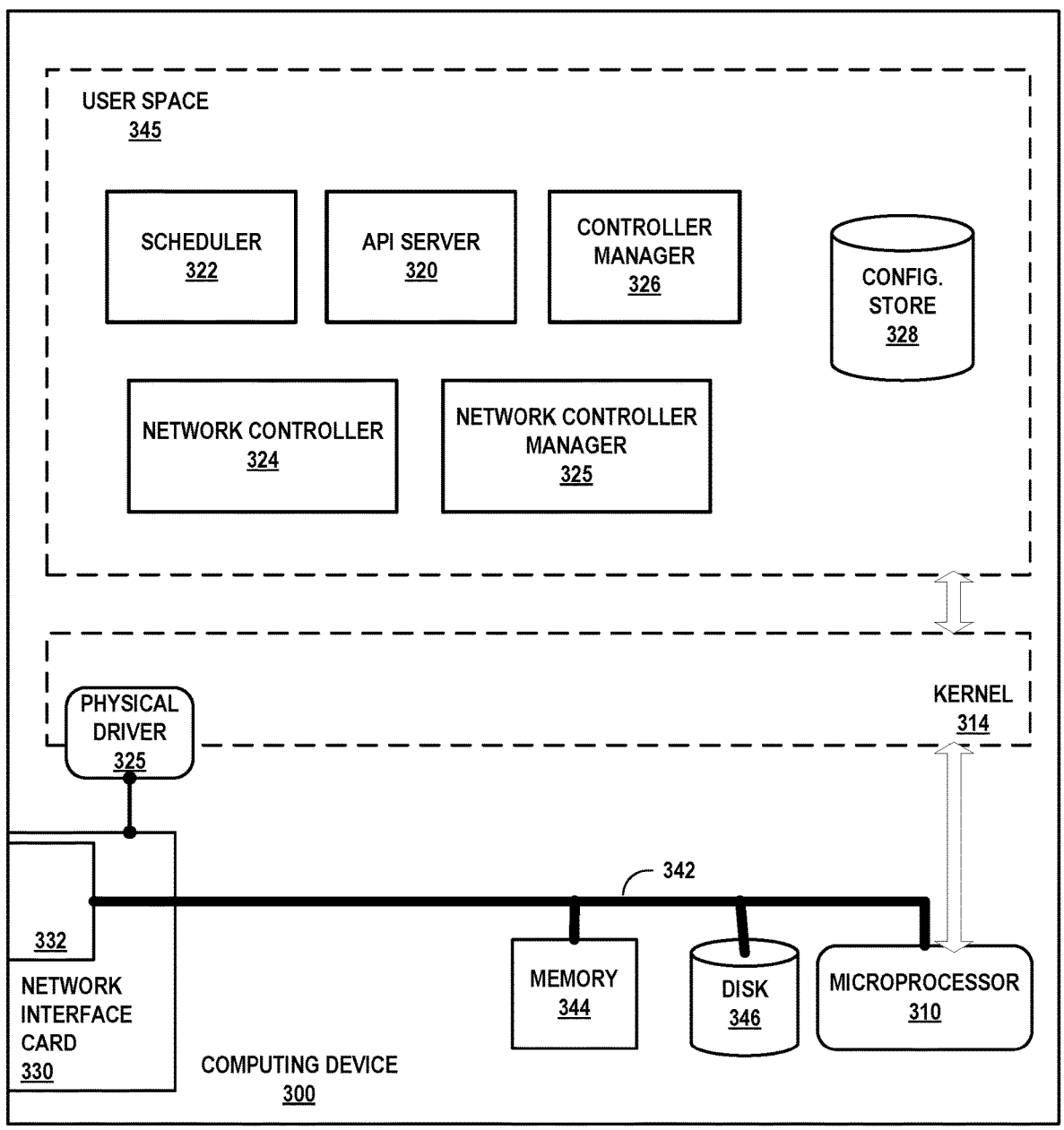
FIG. 3 is a block diagram of an example computing device operating as an instance of controller for a virtualized computing infrastructure.

FIG. 3 is a block diagram of an example computing device operating as an instance of controller for a virtualized computing infrastructure. Computing device 300 an example instance of controller 5 for a virtualized computing infrastructure. Computing device 300 of FIG. 3 may represent one or more real or virtual servers configured to perform operations for at least one of a network controller 24 and an orchestrator 23. As such, computing device 300 may in some instances implement one or more master nodes for respective clusters.

Scheduler 322, API server 320, network controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, network controller manager 326, network controller 324, network controller manager 325, or configuration store 328. Network controller 324 may represent an example instance of network controller 24 of FIG. 1. Scheduler 322, API server 320, controller manager 326, and network controller manager 325 may implement an example instance of orchestrator 23. Network controller manager 325 may represent an example implementation of a Kubernetes cloud controller manager.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A frontside bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use the network interface card 230.

Computing device 300 may be coupled to a physical network switch fabric that includes an overlay network that extends switch fabric from physical switches to software or "virtual" routers of physical servers coupled to the switch fabric, such virtual router 220 of FIG. 2. Computing device 300 may use one or more dedicated virtual networks to configure minion nodes of a cluster.

API server 320, scheduler 322, controller manager 326, and configuration store may implement a master node for a cluster and be alternatively referred to as "master components." The cluster may a Kubernetes cluster and the master node a Kubernetes master node, in which case the master components are Kubernetes master components.

API server 320 includes code executable by microprocessor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

As described above, during an upgrade, microservices of network controller 324, such as those defined in the control chart, may synchronize first with configuration store 328 to ensure that configuration data is not lost as part of the upgrade. Once the synchronization is complete, the current instantiation of network controller 324 may be disabled, and the new instantiation of network controller 324 may execute. For example, a first set of virtual machines executing on computing device 300, which includes the example where the virtual machines are distributed across multiple computing devices, may execute microservices of network controller 324. As part of an upgrade, a second set of virtual machines executing on computing device 300, again including examples where the virtual machines are distributed across multiple computing devices, execute new microservices of network controller 324.

The new microservices may be defined in an updated or upgraded chart (e.g., new release of the control chart) that computing device 300 receives. Processing circuitry of computing device 300 (e.g., microprocessor 310) may deploy the new microservices on the second set of virtual machines in the manner packaged by the updated chart.

As part of deploying the new microservices in the manner packaged by the updated chart (e.g., updated control chart), processing circuitry (e.g., microprocessor 310) may ensure that the configuration data and cluster state of configuration store 328 is synchronized. For example, microprocessor 310 may spin up one or more "jobs" whose purpose is to synchronize configuration data and cluster state. Once synchronized, computing device 300 may switch over to the second set of virtual machines so that the new upgraded network controller 324 can perform its operations.

In some examples, configuration store 328, or possibly some other database, may store analytics information that is repeatedly backed up to a backup database. As part of deploying the new microservices in the manner packaged by the updated chart (e.g., updated analytics chart), processing circuitry (e.g., microprocessor 310) may retrieve data from the backup database without needing to synchronize to configure store 328 or any other database for storing the analytics information.

Scheduler 322 includes code executable by microprocessor 310. Scheduler 322 may be one or more computer processes. Scheduler 322 monitors for newly created or requested virtual execution elements (e.g., pods of containers) and selects a minion node on which the virtual execution elements are to run. Scheduler 322 may select a minion node based on resource requirements, hardware constraints, software constraints, policy constraints, locality, etc. Scheduler 322 may represent a Kubernetes scheduler.

In general, API server 320 may invoke the scheduler 322 to schedule a virtual execution element, which may select a minion node and returns an identifier for the selected minion node to API server 320, which may write the identifier to the configuration store 328 in association with the virtual execution element. API server 320 may invoke the orchestration agent 209 for the selected minion node, which may cause the container engine 208 for the selected minion node to obtain the virtual execution element from a storage server and create the virtual execution element on the minion node. The orchestration agent 209 for the selected minion node may update the status for the virtual execution element to the API server 320, which persists this new state to the configuration store 328. In this way, computing device 300 instantiates new virtual execution elements in the computing infrastructure 8.

Controller manager 326 includes code executable by microprocessor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller 324 includes code executable by microprocessor 310. Network controller 324 may include one or more computer processes. Network controller 324 may represent an example instance of network controller 24 of FIG. 1. The network controller 324 may be a logically centralized but physically distributed Software Defined Networking (SDN) controller that is responsible for providing the management, control, and analytics functions of a virtualized network. In particular, network controller 324 may be a logically centralized control plane and management plane of the computing infrastructure 8 and orchestrates vRouters for one or more minion nodes.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS /IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 324 programs network infrastructure elements to create virtual networks and may create interface configurations for virtual network interfaces for the virtual networks.

Additional information regarding network controller 324 operating in conjunction with other devices of data center 10 or other software-defined network is found in International Application Number PCT/US2013/044378 and in U.S. patent application Ser. No. 14/226,509, incorporated by reference above.

Network controller manager 325 includes code executable by microprocessor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors the cluster for new objects (e.g., pods and services). Network controller manager 325 may isolate pods in virtual networks and connect pods with services.

Network controller manager 325 may be executed as a container of the master node for a cluster. In some cases, using network controller manager 325 enables disabling the service proxies of minion nodes (e.g., the Kubernetes kube-proxy) such that all pod connectivity is implemented using virtual routers, as described herein.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers.

The following example deployment configuration for this application consists of a pod and the virtual network information for the pod:

```
apiVersion: v1
kind: Pod
metadata:
  name: multi-net-pod
  annotations:
    networks: '[
      { "name": "red-network" },
      { "name": "blue-network" },
      { "name": "default/extns-network" }
    ]'
spec:
  containers:
  - image: busybox
```

```
command:
 - sleep
 - "3600"
imagePullPolicy: IfNotPresent
name: busybox
stdin: true
tty: true
restartPolicy: Always
```

This metadata information is copied to each pod replica created by the controller manager 326. When the network controller manager 325 is notified of these pods, network controller manager 325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network. Network controller manager 325 may drive the creation of multiple virtual network interfaces per-pod replica using one or more network modules 206 for configuring the pod replica host.

Figure 4:
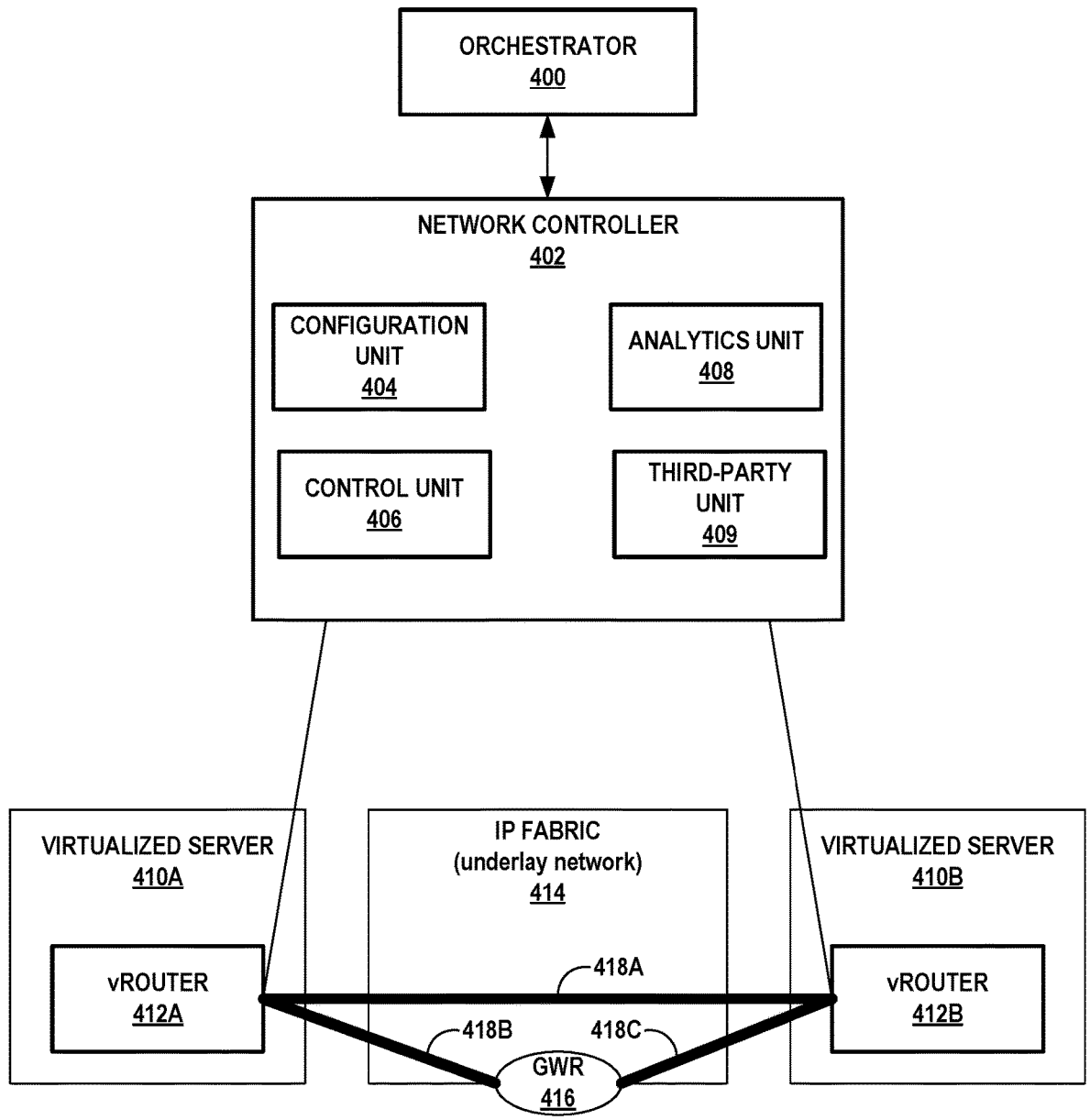
FIG. 4 is a block diagram illustrating another example computing infrastructure illustrating a network controller in further detail in which examples of the techniques described herein may be implemented.

FIG. 4 is a block diagram illustrating another example computing infrastructure illustrating a network controller in further detail in which examples of the techniques described herein may be implemented. FIG. 4 illustrates orchestrator 400, network controller 402, virtualized servers 410A and 410B, and IP fabric 414. Orchestrator 400 is one example of orchestrator 23 (FIG. 1) and network controller manager 325 (FIG. 3). Network controller 402 is one example of network controller 24 (FIG. 1) and network controller 324 (FIG. 3). IP fabric 414 is one example of IP fabric 20 (FIG. 1). Virtualized servers 410A and 410B may execute on respective servers (e.g., server 12A and server 12B) or on the same server. As illustrated, virtualized servers 410A and 410B execute respective vrouters 412A and 412B. Although two virtual servers and two vrouters are illustrated, the example techniques can be extended to more than two virtual servers and more than two vrouters.

In one or more examples, network controller 402 is configured to form an overlay network on IP fabric 414 to establish interconnection tunnels between vrouters 412A and 412B. The vrouters 412A and 412B may be network elements implemented entirely in software. The vrouters 412A and 412B may be responsible for forwarding packets from one virtual machine to other virtual machines via a set of server-to-server tunnels (e.g., interconnection tunnels). The interconnection tunnels form an overlay network sitting on top of a physical IP-over-Ethernet network such as IP fabric 414.

For example, network controller 402 may establish interconnection tunnels 418A as a way for vrouters 412A and 412B to communicate. In some examples, vrouters 412A and 412B may communicate with one another via interconnection tunnels 418B and 418C via gateway router (GWR) 416. In some examples, vrouters 412A and 412B communicate over interconnection tunnels 418A-418C in accordance with MPLS over GRE, MPLS over UDP, or VxLAN.

To perform these various operations, network controller 402 may include configuration unit 404, control unit 406, analytics unit 408, and third-party unit 409. Although one instance of configuration unit 404, control unit 406, analytics unit 408, and third-party unit 409 is illustrated, the example techniques include examples where multiple instances of configuration unit 404, control unit 406, analytics unit 408, and third-party unit 409 are instantiated in a physically distributed manner across many servers 12.

The physically distributed operation of network controller 402 may be beneficial. For example, because there can be multiple redundant instances of any of configuration unit 404, control unit 406, analytics unit 408, or third-party unit 409, operating in an active-active mode, the system can continue to operate without any interruption when any of these example units fails. When any one of configuration unit 404, control unit 406, analytics unit 408, or third-party unit 409 becomes overloaded, additional instances of these example units can be instantiated after which the load is automatically redistributed, so that any single unit may not become a bottleneck and allows the system to manage very large-scale system.

Configuration unit 404 represents the unit via which the charts that package and define deployment of the microservices are received and processed. Control unit 406 represents the microservices defined in the control chart, and analytics unit 408 represents the microservices defined in the analytics chart. For example, the microservices in the control chart may be configured to perform the operations ascribed to control unit 406, and the microservices in the analytics chart may be configured to perform the operations ascribed to analytics unit 408. Similarly, the microservices in the vrouter chart may be configured to perform the operations ascribed to vrouters 412A and 412B. The microservices in the third-party chart may be configured to perform the operations ascribed to third-party unit 409.

As described above, configuration unit 404 may be configured to receive and process the charts that package and define deployment of the microservices. Accordingly, configuration unit 404 is responsible for the management layer. Configuration unit 404 may provide a north-bound Representational State Transfer (REST) Application Programming Interface (API) that can be used to configure the system or extract operational status of the system. The instantiated services are represented by objects in a horizontally scalable database that is described by a formal service data model.

Configuration unit 404 may include a transformation engine (sometimes referred to as a compiler) that transforms the objects in the high-level service data model into corresponding lower-level objects in the technology data model. For example, the charts may define which microservices are packaged and to be deployed, and the manner in which the microservices are to be deployed. Configuration unit 404 may utilize the information from the chart to configure control unit 406, analytics unit 408, and third-party unit 409 in accordance with the manner in which the microservices are to be deployed. Configuration unit 404 may publish the contents of the low-level technology data model to the control unit 406, analytics unit 408, and third-party unit 409 using a configuration database like Cassandra.

Configuration unit 404 may include the following components. Configuration unit 404 may include a REST API Server that provides the north-bound interface to orchestrator 404 or other application. This interface is used to install configuration state using the high-level data model. For example, orchestrator 404 may output the charts (e.g., Helm charts) using the REST API server.

Configuration unit 404 may include a Redis message bus to facilitate communications amongst internal components, and a Cassandra database for persistent storage of configuration. Cassandra is a fault-tolerant and horizontally scalable database. Configuration unit 404 may also include a schema transformer that learns about changes in the high level data model over the Redis message bus and transforms (or compiles) these changes in the high level data model into corresponding changes in the low level data model. Moreover, configuration unit 404 may include a configuration database that provides a south bound interface to push the computed low-level configuration down to control unit 406, analytics unit 408, and third-party unit 409. In some examples, configuration unit 404 may utilize Zookeeper for allocation unique object identifiers and to implement transactions.

Control unit 406 may implement the logically centralized but physically distributed portion of network controller 402. Not all control plane functions of network controller 402 are logically centralized—some control plane functions are still implemented in a distributed fashion on the physical and virtual routers and switches in the network.

Control unit 406 may use a combination of south-bound protocols to "make it so", i.e. to make the actual state of the network equal to the desired state of the network. Examples of the south-bound protocols include Extensible Messaging and Presence Protocol (XMPP) to control the vRouters 412A and 412B as well as a combination of the Border Gateway Protocol (BGP) and the Network Configuration (Netconf) protocols to control physical routers. Control unit 406 may also use BGP for state synchronization amongst each other when there are multiple instances of control unit 406 for scale-out and high-availability reasons.

One or more instances control unit 406 receive configuration state from configuration unit 404 using the configuration database. Instances of control unit 406 exchange routes with other instances of control unit 406 using IBGP to ensure that all instances of control unit 406 have the same network state. Control unit 406 exchanges routes with the vrouters 412A and 412B on the compute nodes (e.g., virtualized servers 410A and 410B) using XMPP. Control unit 406 may also use XMPP to send configuration state such as routing instances and forwarding policy. Control unit 406 may exchange routes with the gateway nodes (routers and switches) (e.g., GWR 416) using BGP, and may send configuration state using Netconf.

Analytics unit 408 may be responsible for collecting, collating and presenting analytics information for trouble shooting problems and for understanding network usage. Each component of the example system illustrated in FIG. 4 may generate detailed event records for every significant event in the system. These event records are sent to one of multiple instances (for scale-out) of analytics unit 408 that collate and store the information in a horizontally scalable database using a format that is optimized for time-series analysis and queries. Analytics unit 408 may have a mechanism to automatically trigger the collection of more detailed records when certain events occur. Analytics unit 408 may provide a north-bound analytics query REST API.

Analytics unit 408 may include the following components. Analytics unit 408 may include a collector that exchanges messages with components in control unit 406 and configuration unit 404 to collect analytics information. In some examples, analytics unit 408 may use a NoSQL database for storing the analytics information.

Analytics unit 408 may include a rules engine to automatically collect operational state when specific events occur, a REST API server that provides a northbound interface for querying the analytics database and for retrieving operational state, and a query engine for executing the queries received over the northbound REST API. The query engine may provide the capability for flexible access to potentially large amounts of analytics data.

As illustrated in FIGS. 5A-8B, respective charts may define the microservices for each one of control unit 406, analytics unit 408, third-party unit 409, and vrouters 412A and 412B. The charts package and define deployment of the microservices so that each one of control unit 406, analytics unit 408, third-party unit 409, and vrouters 412A and 412B can provide their respective operations. In some examples, the arrangement of the charts may allow in service software upgrade of network controller 402.

Figures 5A, 5B:
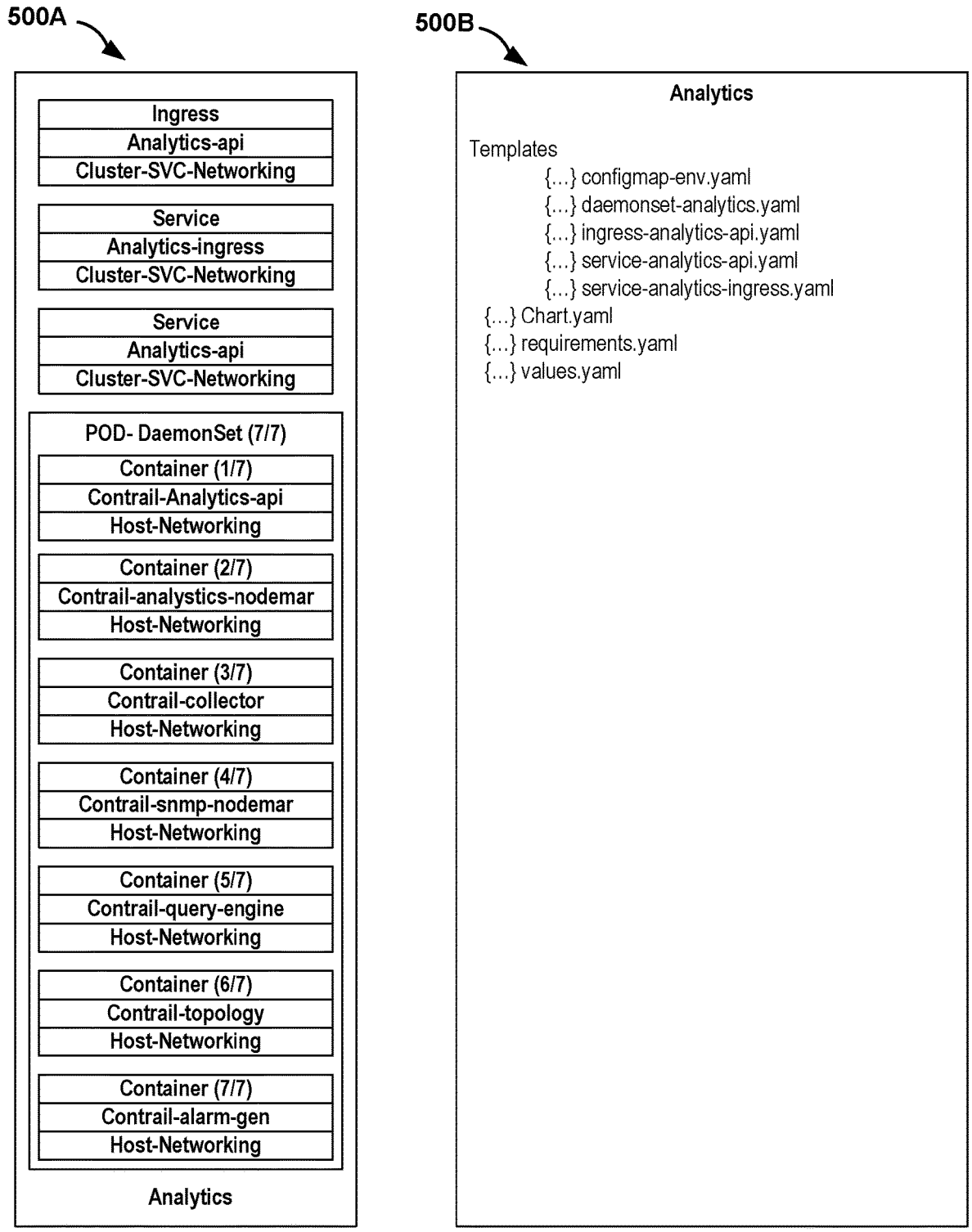
FIGS. 5A and 5B are examples of charts for deployment of microservices that provide analysis of one or more virtual networks.

FIGS. 5A and 5B are examples of charts for deployment of microservices that provide analysis of one or more virtual networks. For example, analytics chart 500A (FIG. 5A) and analytics chart 500B (FIG. 5B) are examples of the analytics chart. Analytics chart 500A illustrates examples of the microservices, and whether the microservices are an ingress, service, or a member of a daemonset (e.g., a set of microservice applications). If an ingress, the microservice provides access to the service microservices. If a member of a daemonset, the microservices are configured such that the pods to which the microservices belong are run on one or more nodes of a cluster. Analytics chart 500B shows the templates that call out the .yaml files for the example microservices, including the requirements .yaml that defines what operations need to be completed for release of this chart, and the values .yaml that defines updated data for microservices defined in analytics chart 500B. The processing circuitry may be configured to receive analytics chart 500B, and analytics chart 500A is a conceptual manner in which to understand analytics chart 500B.

Figure 6A:
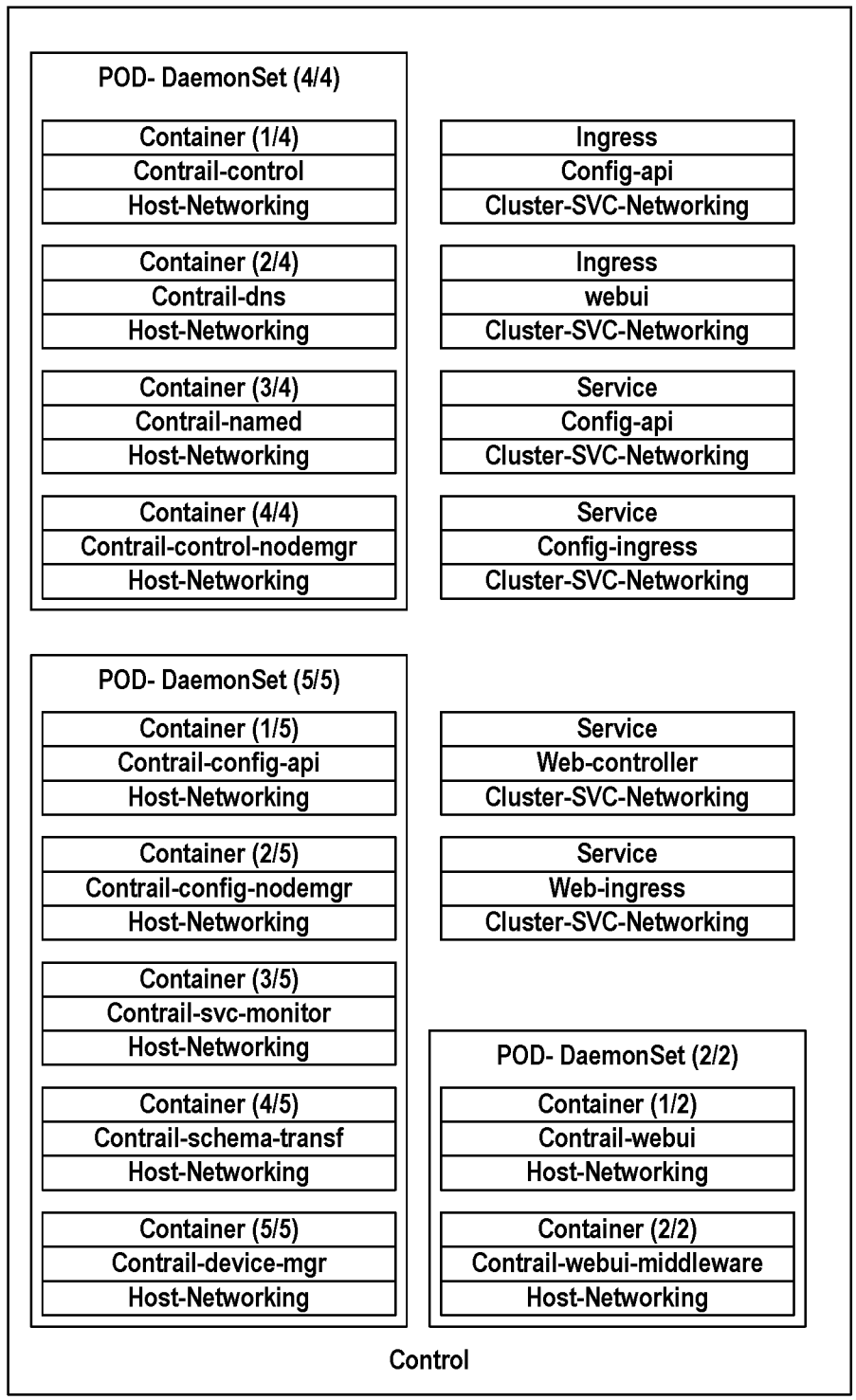
FIGS. 6A and 6B are examples of charts for deployment of microservices that define interconnection tunnels between servers.
Figure 6B:
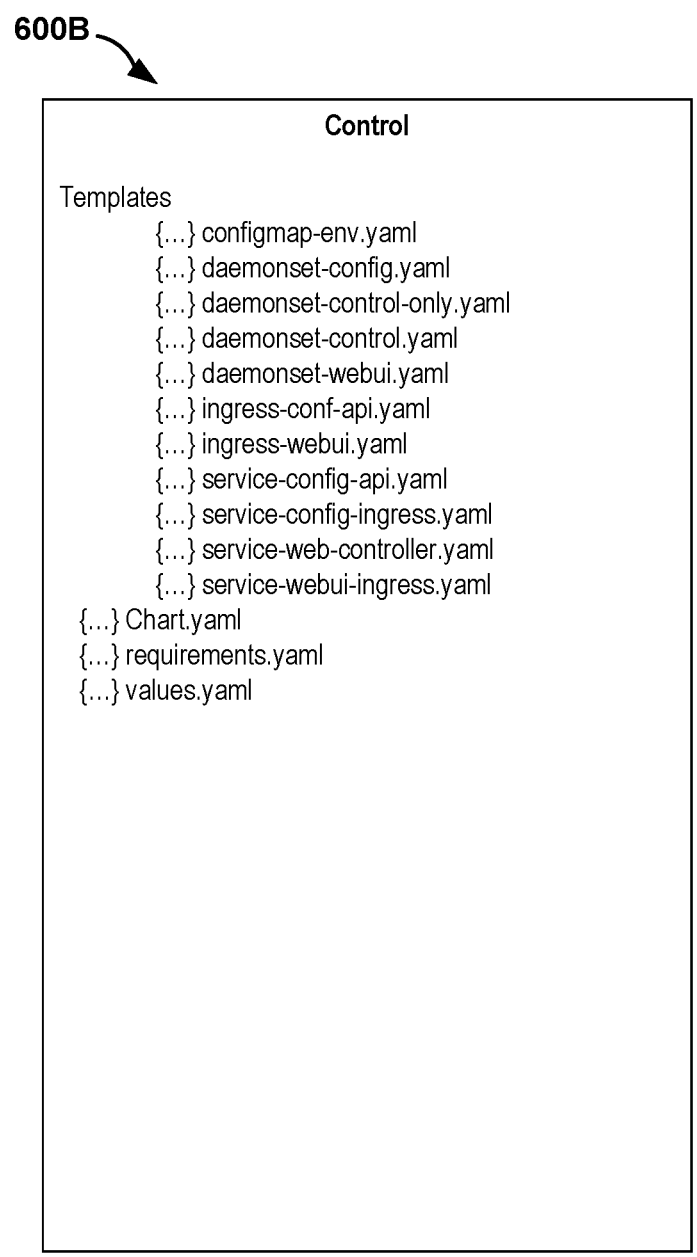

FIGS. 6A and 6B are examples of charts for deployment of microservices that define interconnection tunnels between servers. For example, control chart 600A (FIG. 6A) and control chart 600B (FIG. 6B) are examples of the control chart. Control chart 600A illustrates examples of the microservices, and whether the microservices are part of an ingress, service, or daemonset. If part of an ingress, the microservice provides access to the service microservices. If part of a daemonset, the microservices are configured such that the pods to which the microservices belong are run on one or more nodes of the Kubernetes cluster. Control chart 600B shows the templates that call out the .yaml files for the example microservices, including the requirements .yaml that defines what operations need to be completed for release of this chart, and the values .yaml that defines updated data for microservices defined in control chart 600B. The processing circuitry may be configured to receive control chart 600B, and control chart 600A is a conceptual manner in which to understand control chart 600B.

Figures 7A, 7B:
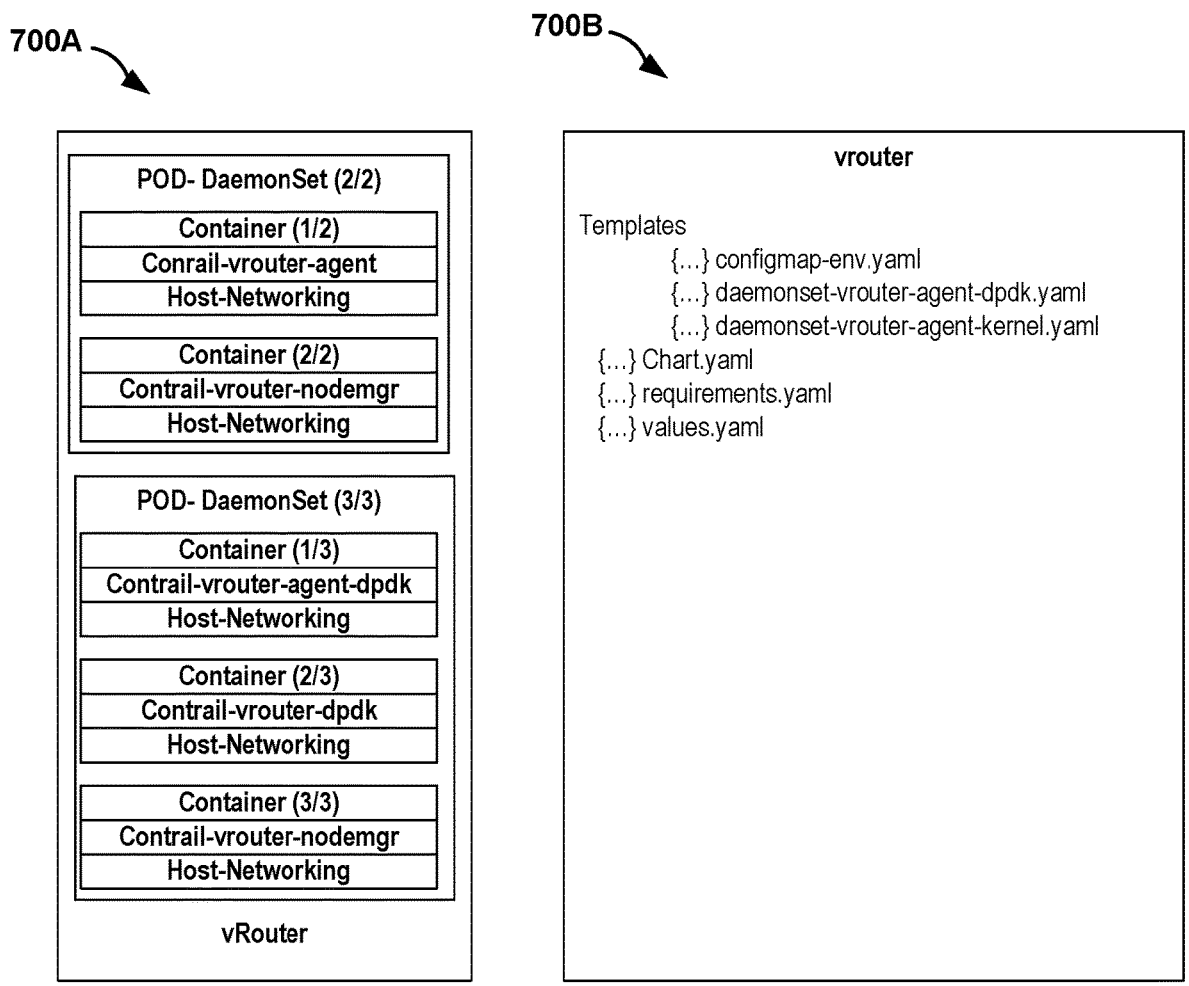
FIGS. 7A and 7B are examples of charts for deployment of microservices that provide virtual routing between servers.

FIGS. 7A and 7B are examples of charts for deployment of microservices that provide virtual routing between servers. For example, vrouter chart 700A (FIG. 7A) and vrouter chart 700B (FIG. 7B) are examples of the vrouter chart. Vrouter chart 700A illustrates examples of the microservices, and whether the microservices are part of an ingress, service, or daemonset. If part of an ingress, the microservice provides access to the service microservices. If part of a daemonset, the microservices are configured such that the pods to which the microservices belong are run on one or more nodes of the Kubernetes cluster. Vrouter chart 700B shows the templates that call out the .yaml files for the example microservices, including the requirements .yaml that defines what operations need to be completed for release of this chart, and the values .yaml that defines updated data for microservices defined in vrouter chart 700B. The processing circuitry may be configured to receive vrouter chart 700B, and vrouter chart 700A is a conceptual manner in which to understand vrouter chart 700B.

Figures 8A, 8B:
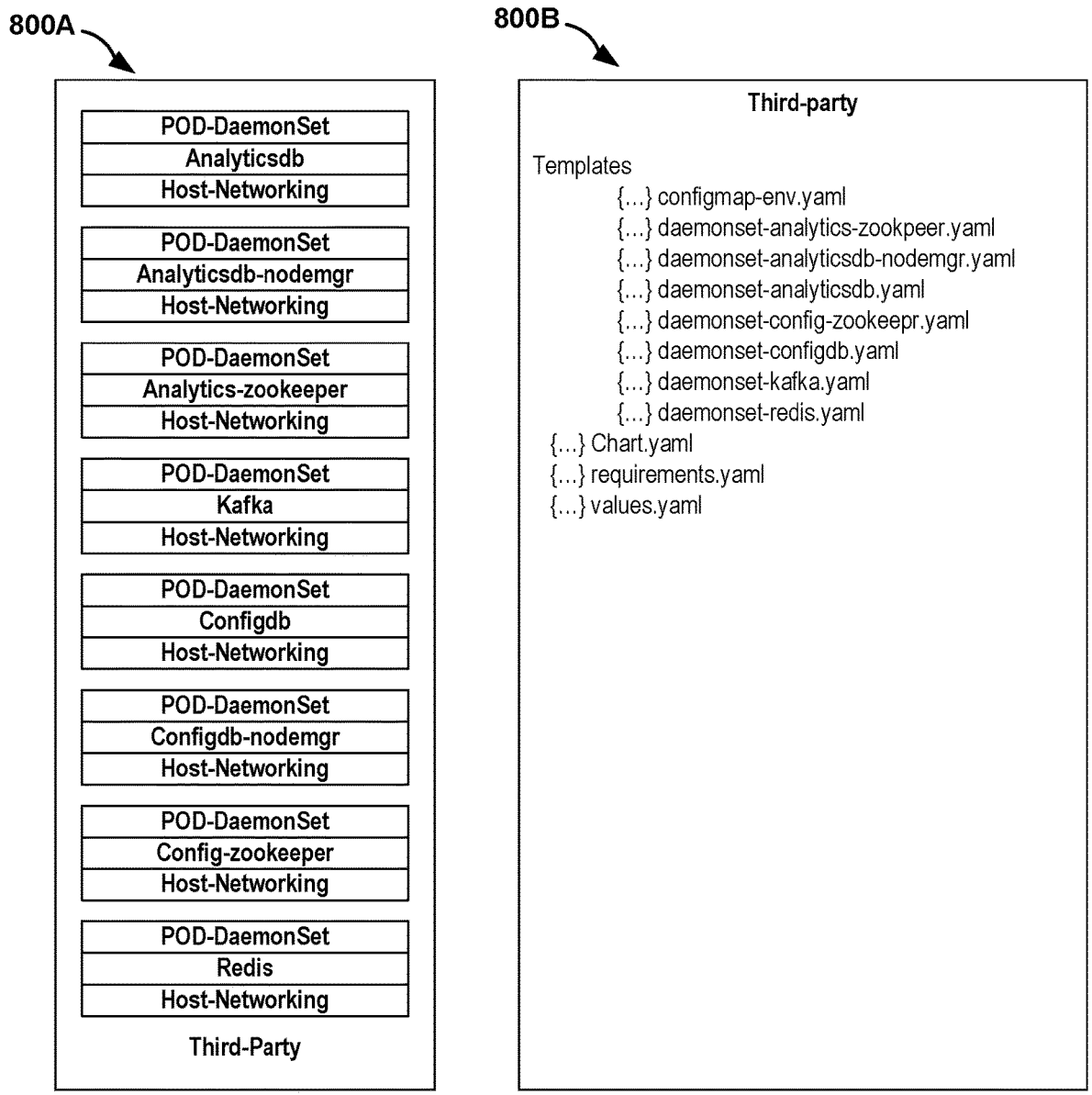
FIGS. 8A and 8B are examples of charts for deployment of microservices that provide third-party tools.

FIGS. 8A and 8B are examples of charts for deployment of microservices that provide third-party tools. For example, third-party chart 800A (FIG. 8A) and third-party chart 800B (FIG. 8B) are examples of the third-party chart. Third-party chart 800A illustrates examples of the microservices, and whether the microservices are part of an ingress, service, or daemonset. If part of an ingress, the microservice provides access to the service microservices. If part of a daemonset, the microservices are configured such that the pods to which the microservices belong are run on one or more nodes of the Kubernetes cluster. Third-part chart 800B shows the templates that call out the .yaml files for the example microservices, including the requirements .yaml that defines what operations need to be completed for release of this chart, and the values .yaml that defines updated data for microservices defined in third-party chart 800B. The processing circuitry may be configured to receive third-party chart 800B, and third-party chart 800A is a conceptual manner in which to understand third-party chart 800B.

Figure 9:
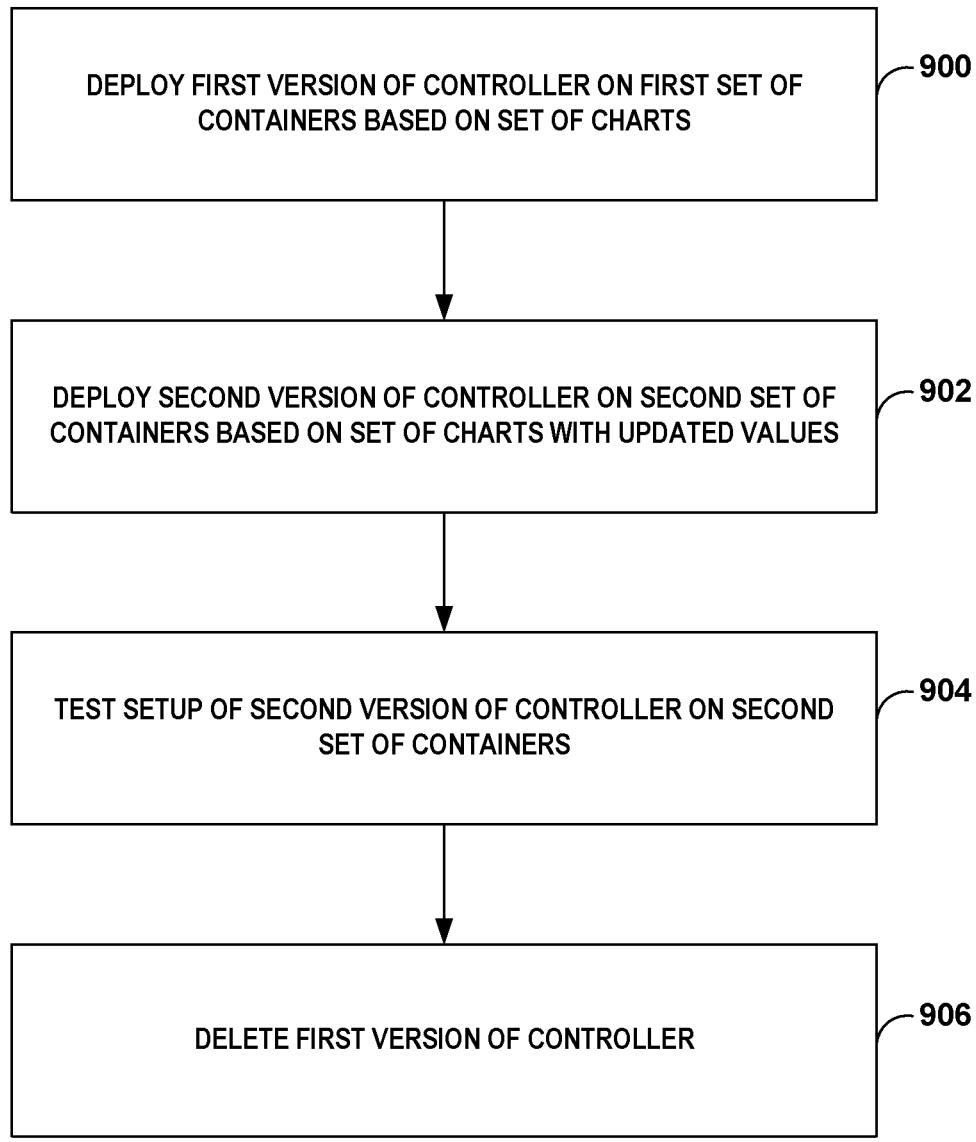
FIG. 9 is a flow diagram illustrating examples of a method of operation, according to techniques described in this disclosure.

FIG. 9 is a flow diagram illustrating examples of a method of operation, according to techniques described in this disclosure. As illustrated in FIG. 9, processing circuitry may deploy a first version of network controller 24 on first set of containers based on a set of charts (900). For example, the processing circuitry may execute distributed network controller 24 on a plurality of containers, which each package and deploy a microservice, across plurality of servers 12 in data center 10. As described above, network controller 24 may be distributed in the sense that network controller 24 is being executed across a plurality of servers 12, and the "processing circuitry" is an example of distributed processing circuitry across servers 12 that are used to execute distributed network controller 24. Via execution of distributed network controller 24, the processing circuitry may establish a virtual network with one or more interconnection tunnels for packetized communications among virtual execution elements executing the plurality of servers 12 in data center 10.

In other words, the processing circuitry is configured to execute a distributed network controller 24 that includes a plurality of microservices packaged and deployed using respective containers for the microservices. The processing circuitry is configured to execute the plurality of microservices of the distributed network controller to establish a virtual network for packetized communications among virtual execution elements executing on the plurality of servers 12 in the data center 10.

In one or more examples, network controller 24 is configured as a plurality of microservices packaged and deployed according to a plurality of charts. Each chart includes one or more templates that define a manner in which the microservices, for performing respective operations of network controller 24, are deployed on the plurality of servers 12 within data center 10. Each container that includes one of the plurality of microservices is executed by a server 12 of the plurality of servers 12 as an isolated user-space instance on the server 12.

In the example of FIG. 9, the processing circuitry may be configured to perform an in service software upgrade (ISSU). To perform such an upgrade, the processing circuitry may deploy a second version of network controller 24 on a second set of containers based on set of charts with updated values (e.g., updated charts) (902). As one example, the plurality of charts includes a control chart that includes microservices that define interconnection tunnels in the virtual network. A first set of containers execute the microservices of the control chart. To perform the ISSU, the processing circuitry receives updates for the control chart to identify new microservices, and deploys and executes the new microservices of the updated control chart on a second set of containers.

Furthermore, the plurality of charts includes an analytics chart that defines microservices that provide analysis of the network. The processing circuitry may be configured to establish communication between both the microservices of the control chart executing on the first set of containers and the new microservices of the updated control chart executing on the second set of containers with the microservices. In this manner, the control functionality of network controller 24 can be updated (e.g., with the update control chart for the second version of network controller 24) while the first version of network controller 24 is executing.

For instance, the control unit 406 of first version of network controller 24 and the control unit 406 of the second version of network controller 24 are communicating with analytics unit 408 of the first version. This ensures that control unit 406 of the second version of network controller 24 does not lose any important data.

In this example, the deployment of the new microservices of the updated control chart on the second set of containers occurs concurrently with the execution of the microservices of the control chart on the first set of containers. The control chart defines a manner in which the microservices that define the interconnection tunnels between the servers are to be deployed.

The processing circuitry may receive an updated analytics chart (e.g., analytics chart for the second version of network controller 24). The processing circuitry may deploy the new microservices of the updated analytics chart, and establish communication between the new microservices of the updated control chart and the new microservices of the updated analytics chart. Moreover, the processing circuitry may be configured to synchronize a database that stores information of currently executing applications with the new microservices being deployed on the second set of containers, and configured to utilize a backup of a database that stored information regarding the analysis of the one or more virtual networks as part of performing the ISSU. Accordingly, by separating out the microservices for the analysis and the microservices for control functionality of the network controller 24 in different charts, it may be possible to piecemeal update network controller 24 from the first version to the second version for implementing ISSU.

The processing circuitry may be configured to test setup of the second version of network controller 24 on the second set of containers (904). For example, the processing circuitry may execute jobs that configure the new microservices of the second version of network controller 24. The processing circuitry may confirm that operations from microservices in an updated vrouter chart are migrating one at a time to the second set of containers, and the like to ensure proper operation of the second version of network controller 24.

The processing circuitry may delete the first version of network controller 24 (906). For example, the processing circuitry may disable execution of the microservices on the first set of containers. The disabling of execution of the microservices may occur subsequent to the synchronization with the database that store configuration data. In this manner, only the updated version of network controller 24 (e.g., second version) may remain executing, while the first version of network controller 24 is disabled.

Various components, functional units, and/or modules illustrated above and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising one or more computing devices, the one or more computing devices comprising:
   a memory configured to store a plurality of charts; and
   processing circuitry configured to execute a distributed network controller that includes a plurality of microservices packaged and deployed to the computing devices using respective containers for the microservices, according to the plurality of charts, each chart includes a templates section within which the microservices for that chart are defined and a manner in which the microservices, for performing respective operations of the distributed network controller, are deployed on a plurality of servers within a data center is defined,
   wherein the plurality of charts include a control chart that includes microservices that when executed by the processing circuitry define interconnection tunnels for a virtual network for packetized communications among virtual execution elements executing on the plurality of servers in the data center,
   wherein a first set of containers execute the microservices of the control chart,
   wherein the processing circuitry is configured to execute the plurality of microservices of the distributed network controller to establish the interconnection tunnels for the virtual network, and
   wherein, to perform an in-service software upgrade (ISSU) of the distributed network controller, the processing circuitry is configured to:
      receive an updated control chart to identify new microservices that when executed by the processing circuitry define the interconnection tunnels for the virtual network;
      deploy the new microservices of the updated control chart on a second set of containers and execute the new microservices to obtain state information for the virtual network and manage the virtual network using the state information without updating microservices for any of the other charts of the plurality of charts; and
      disable, after the new microservices have obtained the state information, execution of the microservices executing on the first set of containers.

2. The system of claim 1, wherein the deployment of the new microservices of the updated control chart on the second set of containers occurs concurrently with the execution of the microservices of the control chart on the first set of containers.

3. The system of claim 1, wherein the control chart defines a manner in which the microservices that define the interconnection tunnels for the virtual network are executed.

4. The system of claim 1, wherein in response to the deployment of the new microservices, the processing circuitry is configured to:
synchronize a database that stores information of currently executing applications with the new microservices being deployed on the second set of containers, wherein the processing circuitry is configured to disable execution of the microservices of the control chart on the first set of containers subsequent to the synchronization.

5. The system of 1, wherein the plurality of charts includes an analytics chart that defines microservices that provide analysis of the virtual network, and wherein the processing circuitry is configured to:
establish communication between both the microservices of the control chart executing on the first set of containers and the new microservices of the updated control chart executing on the second set of containers with the microservices of the analytics chart subsequent to deploying the new microservices of the updated control chart;
receive an updated analytics chart subsequent to deploying the new microservices of the updated control chart;
deploy new microservices of the updated analytics chart; and
establish communication between the new microservices of the updated control chart and the new microservices of the updated analytics chart.

6. The system of claim 5, wherein in response to the deployment of the new microservices of the updated analytics chart, the processing circuitry is configured to:
utilize a backup of a database that stores information regarding the analysis of the virtual network.

7. A method comprising:
executing, with processing circuitry, a distributed network controller that includes a plurality of microservices packaged and deployed to one or more computing devices using respective containers for the microservices, according to a plurality of charts, each chart includes a template section within which the microservices for that chart are defined and a manner in which the microservices, for performing respective operations of the distributed network controller, are deployed on a plurality of servers within a data center is defined, wherein the plurality of charts include a control chart that includes microservices that when executed by the processing circuitry define interconnection tunnels for a virtual network for packetized communications among virtual execution elements executing on the plurality of servers in the data center, and wherein a first set of containers execute the microservices of the control chart; and
establishing, via the distributed execution of the distributed network controller, the interconnection tunnels for the virtual network,
wherein the method further comprising performing an in-service software upgrade (ISSU) of the distributed network controller, wherein performing the ISSU comprises:
receiving an updated control chart to identify new microservices that when executed by the processing circuitry define the interconnection tunnels for the virtual network;
deploying the new microservices of the updated control chart on a second set of containers and executing the new microservices to obtain state information for the virtual network and manage the virtual network using the state information without updating microservices for any of the other charts of the plurality of charts; and
disabling, after the new microservices have obtained the state information, execution of the microservices executing on the first set of containers.

8. The method of claim 7, wherein the deploying and executing the new microservices of the updated control chart comprises deploying and executing the new microservices of the updated control chart on the second set of containers concurrently with the execution of the microservices of the control chart on the first set of containers.

9. The method of claim 7, wherein the control chart defines a manner in which the microservices that define the interconnection tunnels for the virtual network are executed.

10. The method of claim 7, wherein in response to the deployment of the new microservices, the method further comprising:
synchronizing a database that stores information of currently executing applications with the new microservices being deployed on the second set of containers, wherein disabling execution of the microservices comprises disabling execution of the microservices of the control chart on the first set of containers subsequent to the synchronization.

11. The method of 8, wherein the plurality of charts includes an analytics chart that defines microservices that provide analysis of the virtual network, the method further comprising:
establishing communication between both the microservices of the control chart executing on the first set of containers and the new microservices of the updated control chart executing on the second set of containers with the microservices of the analytics chart subsequent to deploying the new microservices of the updated control chart;
receiving an updated analytics chart subsequent to deploying the new microservices of the updated control chart;
deploying new microservices of the updated analytics chart; and
establishing communication between the new microservices of the updated control chart and the new microservices of the updated analytics chart.

12. The method of claim 11, wherein in response to the deployment of the new microservices of the updated analytics chart, the method further comprising:
utilizing a backup of a database that stores information regarding the analysis of the virtual network.

13. A non-transitory computer-readable storage medium storing instructions thereon that when executed cause one or more processors to:
execute a distributed network controller that includes a plurality of microservices packaged and deployed to one or more computing devices using respective containers for the microservices, according to a plurality of charts, each chart includes a templates section within which the microservices for that chart are defined and a manner in which the microservices, for performing respective operations of the distributed network controller, are deployed on a plurality of servers within a data center is defined, wherein the plurality of charts include a control chart that includes microservices that when executed define interconnection tunnels for a virtual network for packetized communications among virtual execution elements executing on the plurality of servers in the data center, and wherein a first set of containers execute the microservices of the control chart; and establish, via the distributed execution of the distributed network controller, the interconnection tunnels for the virtual network, wherein the instructions further cause the one or more processors to perform an in-service software upgrade (ISSU) of the distributed network controller, wherein the instructions that cause the one or more processors to perform the ISSU comprise instructions that cause the one or more processors to:
receive an updated control chart to identify new microservices that when executed define the interconnection tunnels for the virtual network;
deploy the new microservices of the updated control chart on a second set of containers and execute the new microservices to obtain state information for the virtual network and manage the virtual network using the state information without updating microservices for any of the other charts of the plurality of charts; and
disable, after the new microservices have obtained the state information, execution of the microservices on the first set of containers.

14. The non-transitory computer-readable storage medium of claim 13, wherein the instructions that cause the one or more processors to deploy and execute the new microservices of the updated control chart comprise instructions that cause the one or more processors to deploy and execute the new microservices of the updated control chart on the second set of containers concurrently with the execution of the microservices of the control chart on the first set of containers.

15. The non-transitory computer-readable storage medium of claim 13, wherein the control chart defines a manner in which the microservices that define the interconnection tunnels for the virtual network are executed.

16. The non-transitory computer-readable storage medium of claim 13, wherein in response to the deployment of the new microservices, the instructions further cause the one or more processors to:
synchronize a database that stores information of currently executing applications with the new microservices being deployed on the second set of containers,
wherein instructions that cause the one or more processors to disable execution of the microservices comprise instructions that cause the one or more processors to disable execution of the microservices of the control chart on the first set of containers subsequent to the synchronization.

17. The non-transitory computer-readable storage medium of claim 13, wherein the plurality of charts includes an analytics chart that defines microservices that provide analysis of the virtual network, and wherein the instructions further cause the one or more processors to:
establish communication between both the microservices of the control chart executing on the first set of containers and the new microservices of the updated control chart executing on the second set of containers with the microservices of the analytics chart subsequent to deploying the new microservices of the updated control chart;
receive an updated analytics chart subsequent to deploying the new microservices of the updated control chart;
deploy new microservices of the updated analytics chart; and
establish communication between the new microservices of the updated control chart and the new microservices of the updated analytics chart.

* * * * *